United States Patent Office 3,334,986
Patented Aug. 8, 1967

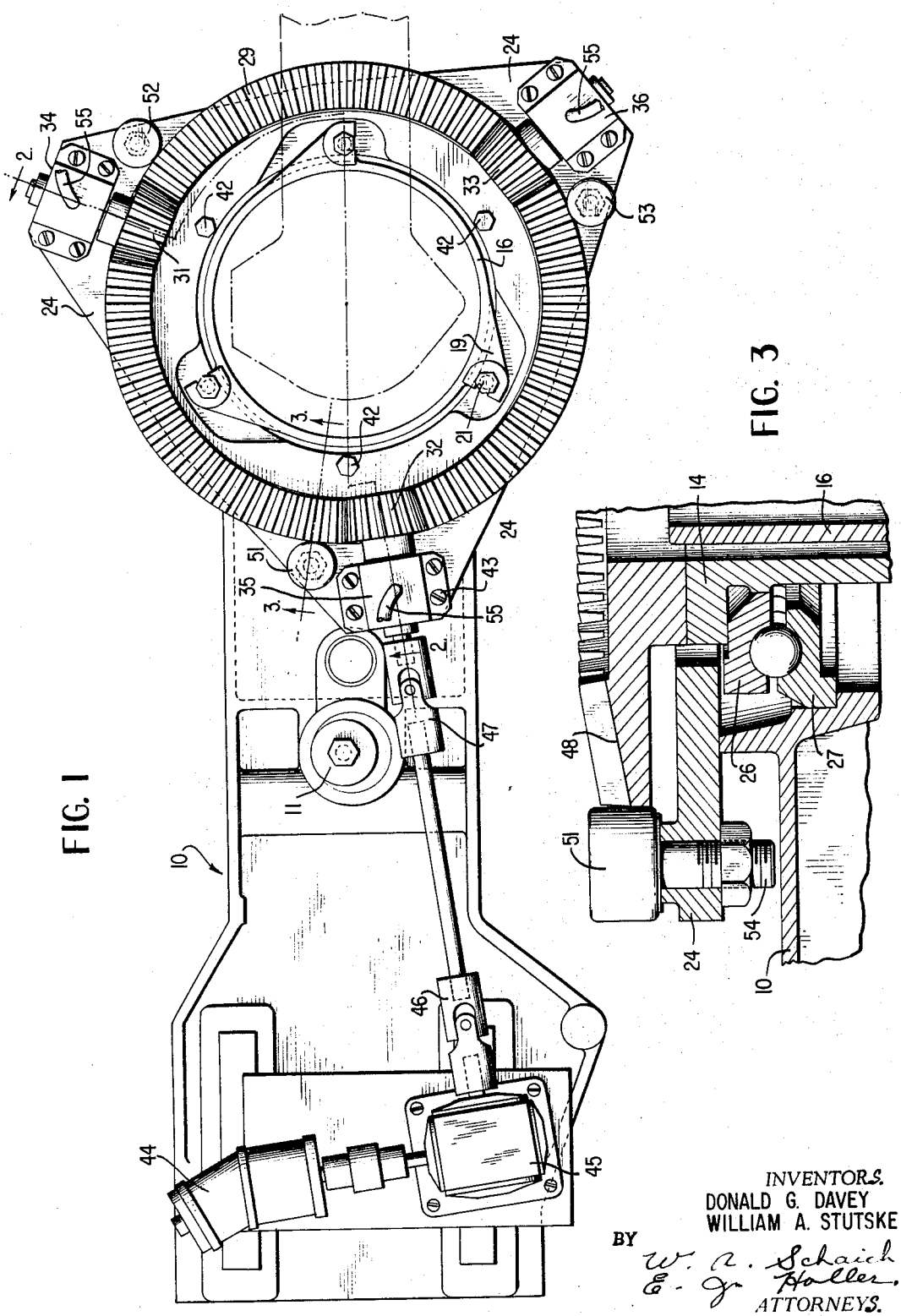

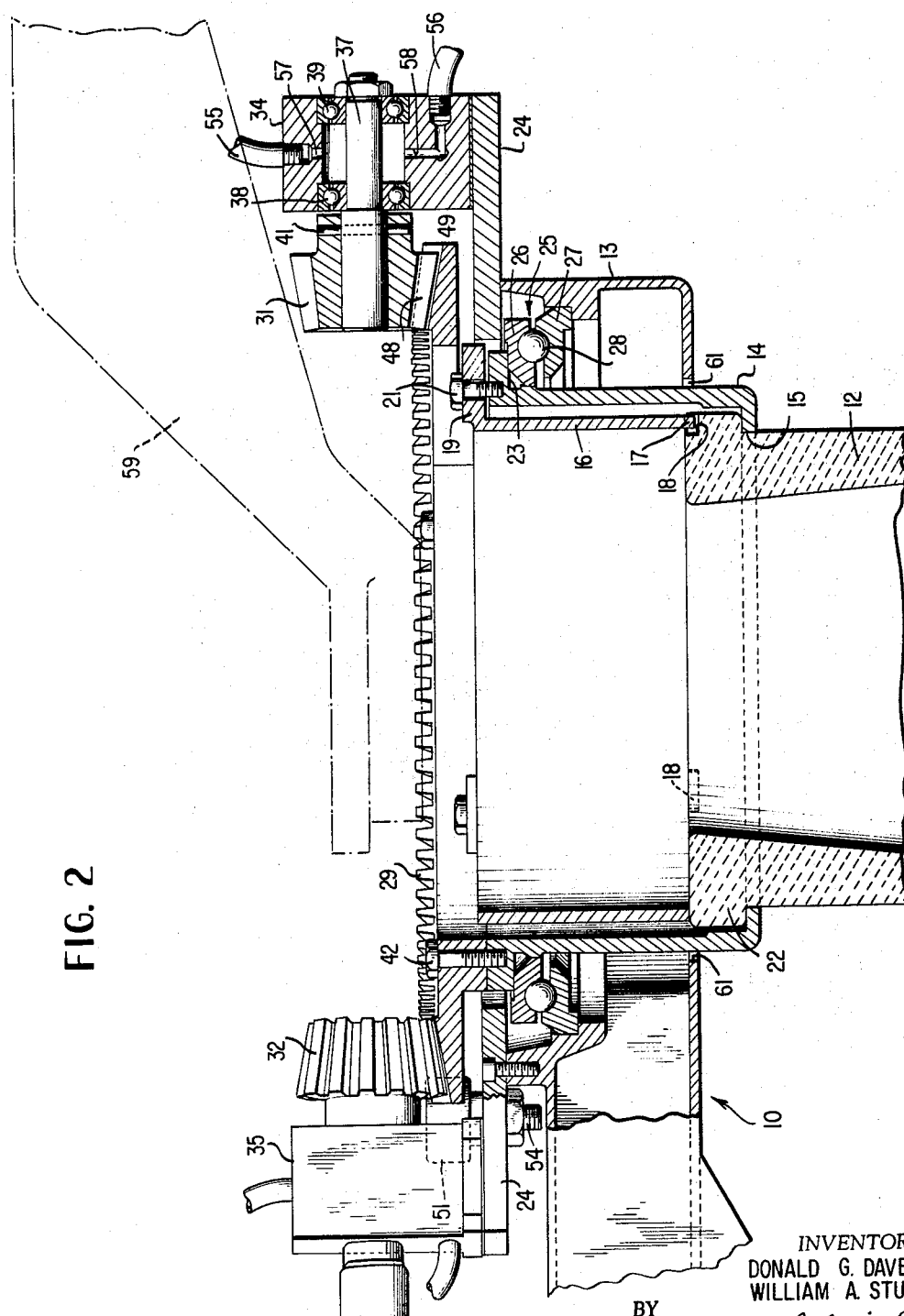

3,334,986
MOLTEN GLASS FEEDER TUBE CENTERING AND DRIVE
Donald G. Davey and William A. Stutske, Toledo, Ohio, assignors to Owens-Illinois, Inc., a corporation of Ohio
Filed Feb. 11, 1963, Ser. No. 257,725
5 Claims. (Cl. 65—324)

This invention relates generally to method and apparatus for supporting and driving a mixing tube in a feeder employed with automatic glass furnaces, and more particularly to improved drive means for rotating the tube to provide reduced contamination of the glass resulting from the corrosion and wear products dropping from the rotating mechanism into the feeder.

Previous patents such as No. 1,750,972 to Soubier have shown means for withdrawing molten glass from an orifice about which the glass is mixed or agitated by means of a rotating tube extending into the forehearth. Such apparatus has generally been driven by chain and sprockets, but with a number of serious disadvantages which cause corrosion and wear failure of the mechanism and unacceptable lost time while the furnace is shut down for repairs. Stressed bearing parts above the molten glass cause wear particles to enter the melt and decrease the quality of product below that satisfactory for such use as TV picture tubes, caused especially by the drive mechanism.

It is also known that a feeder tube of this type may be driven by a ring and pinion gear, but previously with the disadvantage, as in the case of the chain and sprocket drive, that lateral forces are introduced on the bearing which tend to make the tube ride up on one side to unduly stress the bearings. The rotation may be nonuniform and an irregular feed may cause spoilage of the formed product. A further difficulty has been that thrust bearings used in the immediate vicinity of the molten glass are of short life, when laterally stressed as by a lateral drive, and tend to corrode and to lose material which enters the melt, thereby producing irregularities and non-uniformities in the glass spoiling the product when finally formed. Chain drives in particular produce large lateral forces tending to more quickly promote oxidation and wear to destroy the bearings, especially under conditions where the bearings may not be continuously or sufficiently lubricated because of the temperature. Previous drives and bearing supports for feeder tubes have, therefore, been difficult to mount and control to avoid entry of drive and bearing material into the melt as it is surface-weakened by corrosion to cause high stress types of wear and sluffing off of surface material.

It is accordingly an object of the present invention to provide a glass feeder tube drive which is less influenced by lateral forces consequent from the drive mechanism and in which the tube is maintained accurately centered.

Another object of the invention is to provide a low stress massive centering mechanism which is symmetrical about a central axis and under low stress to minimize stress-induced wear.

A further object of this invention is to provide fluid motor drive means coupled with symmetrical holding means centering a rotating feeder tube during the drawing of glass from a furnace in which the lost material is carried away from the melt.

A still further object of this invention is to provide rigidly symmetrical back-up means for confining the motion of a feeder tube to accurately centered rotation regardless of extraordinary forces which may occasionally result from the mixing and at the same time to avoid small deviations from uniform symmetrical rotation.

These features and advantages are provided in the present invention by mounting a symmetrical ring gear exteriorly at the head of the mixing tube, which is centered by three like pinion gears arranged closely meshing with the ring gear at equal intervals about the periphery thereof, each supported by ball bearings outside of the region of high temperature operation, in a manner to cause any metallic corrosion particles to fall away from the glass in the feeder. Additionally, applicant provides positioning rollers accurately confining the motion to centered rotation. These and other features of the invention will be more clearly understood by reference to the following drawings in which FIG. 1 is a plan view of apparatus according to this invention;

FIG. 2 is primarily a sectional view of the apparatus of FIG. 1 taken along line 2—2; and FIG. 3 is a sectional view taken along line 3—3 of FIG. 1.

According to conventional construction, the melting furnace has a forehearth from which glass is continuously drawn. A frame 10 supports the feeder, usually borne on a vertical post 11 such that the assembly may be rotated from the operative position over the forehearth when desired. Post 11 may be suitably mounted according to conventional practice adjacent the end of the forehearth. Frame 10 supports a feeder tube 12 within an extension 13 by means of a collar or cup member 14 carried by the frame extension 13. Collar 14 is provided with an inwardly turned flange portion having an aperture 15 centrally therein of size suitable to receive the feeder tube 12 in close-fitting arrangement.

Clamp member 16 holds feeder tube in collar 14 and may be held against relative rotation by a plurality of key projections 17 on the frame of the clamp 16 in which the projections 17 may bear on the horizontal surface of the tube end, or the feeder tube 12 may be supplied as at 18 with slots for engagement with the keys 17. Clamp 16 is generally cylindrical and supplied with ears 19 extending horizontally out from a vertical cylindrical portion for bolted engagement with the collar 14 to provide adjustable clamping by way of the clamping bolts 21. As bolts 21 are tightened flanged portion 22 on the upper end of the tube 12 is clamped against the collar 14, and ears 19 overlie horizontal flange 23 of collar 14. The tube is snugly fitted in collar 14 to form a vapor seal preventing gases in tube 12 from reaching the supporting structure.

Rotation of the assembly comprising the tube 12, the collar 14 and the clamp 16 is facilitated by the provision of a thrust bearing shown generally at 25 consisting of an upper race member 26 firmly engaging the flange 23 of collar 14 and having a lower race portion 27 suitably fitted into the frame 13, the thrust bearing being completed by ball bearings 28 retained between members 26 and 27. The rotating assembly thus arranged lies within a circular aperture of a support structure 24 carried on the frame 13 and secured thereto as by stud bolts. The flange 23 and the ears 19 are preferably arranged to rotate within the aperture of the support 24 as controlled by the spacing of thrust bearing 25.

According to the present invention a ring gear 29 is provided for rotating the tube 12 on bearing 25, the gear being bevel-formed on the upper face of a ring 30 having a frusto-conical face coaxial with the collar 14. Pinion gears 31, 32 and 33 are mounted in closely meshed relationship to the gear 29 to force the ring 30 downwardly at three points equally distributed around the periphery of collar 14 to provide positioning against vertical and axial forces on tube 12. Pinion gears 31, 32 and 33 are supported in blocks 34, 35 and 36, each by a shaft as shown at 37 within a block as at 34 by a first and second ball bearings 38 and 39, and each pinion gear is preferably keyed to the shaft as at 41. Ring 30 is rigidly secured to the flange 23 of collar 14, preferably by stud bolts as illustrated at 42. Blocks 34, 35 and 36 are adjustably secured to support frame 24 by suitable means such as bolts 43, and suitable shims between frame 24 and the bearing blocks.

A rotating mechanism is thus provided which drives and centers the tube against highly variable forces occasionally rising in the drawing of glass from a feeder and accomplishes this rotary drive without imparting to the mechanism lateral forces sufficient to upset the axial alignment or to cause appreciable riding up of the thrust members on the balls 28 of the thrust bearing 25, as happens with the conventional chain drive or other mechanism operating through a peripheral drive at positions 90 degrees separate from the point of application of the peripheral thrust or pull. This tendency to ride up on the race members 26 and 27 is a primary cause of failure in prior art feeder tube rotating mechanisms. A remedy is here provided in that the ring gear is driven by pinion gears including three or more pinion gears at points distributed around the ring gear adjusted such that the pinions closely mesh the gears 29.

A steadier supply of power to the pinion gears is provided by the use of a fluid motor as at 44 connecting with the gear box 45 for suitable speed change and for coupling by way of universal joints 46 and 47 to a shaft driving one of the pinion gears as at 32. The use of the fluid motor is preferred in that it provides a steady flow of power which is free of vibration of any kind tending to cause irregular forces on the balls 28 of bearing 25.

It will further be noted that ring gear 29 has its beveled portion declining outwardly from the horizontal plane at the point of engagement with the pinion gears and that properly adjusted pinion gears 31, 32 and 33 provide a positive three-point centering means as well as a positive three-point downward thrust on the tube assembly supported by the thrust bearing 25. This provides radial and axial forces for maintaining the rotation of the assembly always concentric with the same axis to prevent the riding up of the rotating assembly due to any extraordinary resistance to motion caused by the drive. The arrangement described has the further advantage that the centering means and the rotary forces are self-centering by virtue of the opposed inclinations of the beveled face of the ring engaging the pinions. Since it sometimes happens that unusual forces are exerted, applicant does not rely solely upon the more massive structure provided in his pinion and bearing assemblies but provides additional back-up centering means in the form of confining rollers 51, 52 and 53 distributed equally around the ring 30 which has a circular outer cylinder portion 49. These back-up rollers are preferably mounted on frame 24 adjacent to blocks 34, 35 and 36 at equal intervals to provide reinforcement for the centering means. Each roller 51, 52 and 53 is preferably arranged to be adjacent to the cylindrical surface 49 but not in contact therewith inasmuch as steadier motion of the rotary assembly is provided by the ring and pinion gear symmetrical arrangement in cooperation with the thrust bearing 25 except in unusual operational conditions. These back-up rollers are rigidly and rotatably mounted by studs 54 on the frame 24.

In the assembly described the primary centering is effected by the symmetrical array of pinion gears engaging the ring gear. This arrangement permits the placement of these centering elements remotely from th area immediately above the molten glass, and thereby permits operation of these pinions in a relatively cool atmosphere. High strength and low friction are maintained in that shaft 37 is carried by ball bearings 38 and 39 within the block 34. Continuous lubrication may be provided for the ball bearings, and the oil supply may consist of a line 55 extending to each of the blocks 34, 35 and 36 from which the used oil is drained by way of line 56. Connection from the lines 55 and 56 is made to the interior of the block 34 by way of ducts 57 and 58. Cooling may be provided for this bearing by employment of an oil and air mixture in the form of an oil mist passing to the bearing by way of line 55.

Projection of the apparatus against the corrosive gases which overlie molten glass is provided in a pivoted support arm 59 which may carry a closure for the space within the opening of the ring 30.

The frame portions 13 is provided with a clearance space illustrated at 61 in which the cup or collar 14 rotates. Sufficient space is provided to permit a desired degree of adjustment in alignment and to further provide for air cooling by means of a stream of air circulating around the bearing 25. The clearance between flange 23 and support 24, the introduction of cooling air by conventional means may serve to drive hot corrosive gases from the region of the bearing 25.

While the present invention has been described with respect to a specific embodiment found to accomplish the object of this invention it will be understood by those skilled in the art that various modifications and alterations may be made within the teachings thereof and within the scope of the appended claims.

What is claimed is:

1. A glass feeder tube support and rotating mechanism wherein axial centering and positioning is effected at a single tube flange, comprising
    thrust bearing means including exterior tube flange means and cooperating thrust bearing means disposed for support of said tube against downward motion,
    ring gear means concentrically secured to said flange means being of beveled configuration to face upwardly and outwardly at an angle less than 90° from a rotational axis of said tube,
    multiple pinion gear means supported in close-meshed relation to said ring gear means and having fixed horizontal axes of rotation disposed in a plane perpendicular to said axis at horizontal separations to provide a balancing of radial forces against said gear means,
    means for adjustably holding said pinion gears in downward thrust opposite to the supporting thrust of said bearing means for preventing radial and longitudinal motion of said tube,
    said thrust bearing means and pinion gear means comprising means for centering the tube about a fixed axis and holding the tube at a fixed longitudinal position therealong during rotation, and
    means for driving at least one pinion gear about one said axis.

2. A mechanism according to claim 1, said pinion gears being shaft-mounted in closed bearings exterior to the periphery of said tube and based therefrom sufficiently to permit circulated air cooling thereabout.

3. A mechanism according to claim 1, further comprising rotary stop members disposed adjacent said ring gear on vertical axes to confine said ring gear means to a position perpendicular to and coaxial with a desired rotational axis for said tube mechanism.

4. A feeder tube mechanism adapted for mixing glass at a feeder having a stirring tube extending downwardly about an axis through said feeder, comprising
    a stirring tube extending downwardly about an axis through said feeder,
    flange means for supporting said tube above said glass disposed perpendicularly to said axis about the outer periphery of the tube,
    a first thrust bearing disposed to urge said flange means in one direction along said axis,
    a second thrust bearing disposed to urge said flange means in an opposite direction along said axis,
    said first thrust bearing comprising at least three beveled pinion gears each rotative about a line within a plane perpendicular to said axis and at distributed points around said flange means and further comprising a complementarily beveled ring gear concentrically mounted on said flange means tightly engaging said gears to provide a centering force therefore and a force along said axis opposing the axial force supplied by the second said thrust bearing, shaft mounting means for supporting said pinion gears for rotation about said lines outwardly from the heated vicinity of said tube, and means driving at least one said shaft to provide rotation of said tube.

5. In a glass furnace feeder having a vertically disposed mixing tube entrant from above into a molten mass of glass and supported by bearings exterior thereto for rotation about a central axis thereof, improved driving and centering means, comprising cylindrical structure means supporting said tube on said bearings for rotation about said axis, a ring gear having a circular periphery concentrically attached exteriorly to said means and having a conical gear face upwardly inclined toward said axis, multiple pinion gear means each supported about a horizontal fixed shaft exteriorly of said ring gear in symmetrical array within a common plane perpendicular to said axis for holding said ring gear firmly centered on said bearings at fixed location on and about said axis, metallic sealing ring means between said ring gear and said tube whereby vapors within said tube are prevented from escape to the region of said pinion gears, support means for said tube attached to said sealing means including roller bearing means exterior thereto, and sealing means preventing vapors exterior to said tube from escaping from said feeder to the region of said bearings.

References Cited

UNITED STATES PATENTS

| | | | |
|---|---|---|---|
| 832,238 | 10/1906 | Clark | 74—417 |
| 1,843,248 | 2/1932 | Soubier | 65—331 |
| 3,078,976 | 2/1963 | Whinery | 192—61 |

FOREIGN PATENTS 400,865  11/1933  Great Britain.

DONALL H. SYLVESTER, *Primary Examiner.*

D. CRUPAIN, A. D. KELLOGG, *Assistant Examiners.*